United States Patent [19]

Latsch

[11] 4,417,556
[45] Nov. 29, 1983

[54] METHOD FOR CLOSED-LOOP CONTROL OF THE INSTANT OF IGNITION

[75] Inventor: Reinhard Latsch, Vaihingen, Fed. Rep. of Germany

[73] Assignee: Robert Bosch GmbH, Stuttgart, Fed. Rep. of Germany

[21] Appl. No.: 191,742

[22] Filed: Sep. 29, 1980

[30] Foreign Application Priority Data

Sep. 29, 1979 [DE] Fed. Rep. of Germany ....... 2939580

[51] Int. Cl.³ .................................. F02D 37/02
[52] U.S. Cl. .................................. 123/425; 123/435; 73/35; 73/115
[58] Field of Search ............ 123/425, 435, 415, 416; 73/35, 115

[56] References Cited

U.S. PATENT DOCUMENTS

| 2,543,141 | 2/1951 | Vichnievsky | 73/35 |
| 3,957,023 | 5/1976 | Peterson | 123/425 |
| 4,063,538 | 12/1977 | Powell et al. | 123/146.5 A |
| 4,130,097 | 12/1978 | Ford | 123/416 |
| 4,131,097 | 12/1978 | Sawada et al. | 123/425 |
| 4,190,027 | 2/1980 | Inui et al. | 123/425 |
| 4,232,545 | 11/1980 | Dobler et al. | 123/425 |

FOREIGN PATENT DOCUMENTS 1512213  5/1978  United Kingdom ............ 123/435

Primary Examiner—William A. Cuchlinski, Jr.
Assistant Examiner—Andrew M. Dolinar
Attorney, Agent, or Firm—Edwin E. Greigg

[57] ABSTRACT

A method for closed-loop control of the instant of ignition is proposed, in which the position of the peak combustion chamber pressure after top dead center is ascertained with the aid of an ionic current and made to assume a set-point value for this position. In this manner, a very simple probe having inexpensive circuitry can be used for optimizing the instant of ignition.

15 Claims, 10 Drawing Figures

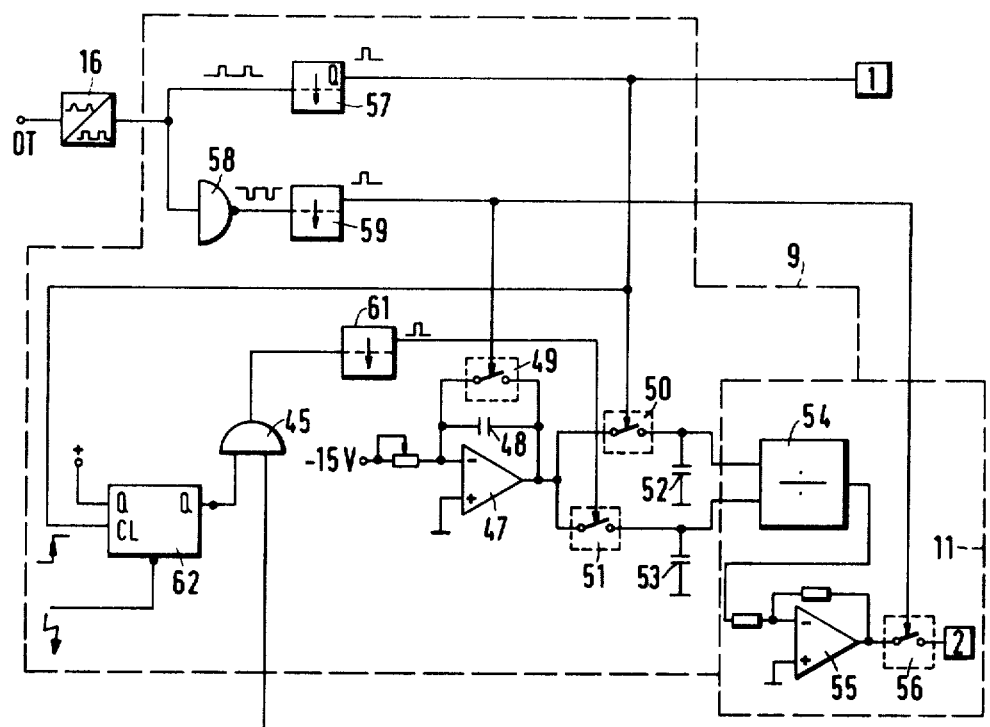
FIG. 8(a)
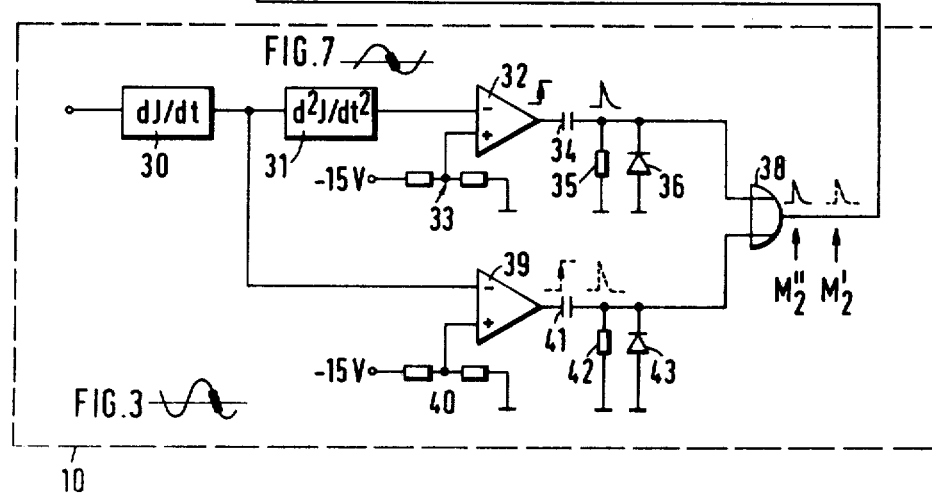

METHOD FOR CLOSED-LOOP CONTROL OF THE INSTANT OF IGNITION

CROSS REFERENCE TO RELATED APPLICATIONS

This application discloses subject matter in common with applications, Ser. No. 191,743, now U.S. Pat. No. 4,391,240 and Ser. No. 191,749, now U.S. Pat. No. 4,377,140. The inventions disclosed in these three applications are commonly assigned.

BACKGROUND OF THE INVENTION

The invention relates to a method for the closed loop control of the instant of ignition utilizing peak combustion chamber pressure detection relative to the occurrence of top dead center in the combustion chamber.

In internal combustion engines functioning with externally supplied ignition, it is known to control the instant of ignition in closed-loop fashion in accordance with the occurrence of the peak pressure relative to the occurrence of top dead center during the combustion process. An optimal set-point value representative of the angular crankshaft position at which the peak pressure is supposed to occur in the combustion chamber is generated, and the instant of ignition is appropriately corrected when there is a deviation from this set-point value. (See Powell; "Closed Loop Control of Spark Timing", Automobile Engine Control Symposium, April, 1976).

The combustion chamber pressure is detected by a transducer. The transducers for detecting the combustion chamber pressure are, however, problematical in terms of their manufacture, functional reliability, and ease of installation in the combustion chamber of an internal combustion engine.

OBJECT, SUMMARY AND ADVANTAGES OF THE INVENTION

It is an object of the present invention to provide a method for closed-loop control of the instant of ignition according to which the peak combustion chamber pressure is detected by monitoring the ion current released during combustion of the operational mixture in a combustion chamber.

The invention teaches detecting the peak combustion chamber pressure by measuring the ion current released during combustion of the operational mixture in a combustion chamber and detecting the maximum of the ion current occuring after top dead center has occurred, which maximum is a measure of the peak combustion chamber pressure.

The method according to the invention has the advantage that the ionic current sensor utilized as a transducer for the location of the peak combustion chamber pressure is substantially less expensive and is not problematical in terms of its functional efficacy and installation. It is particularly advantageous that even the spark plug used for ignition, slightly modified, can serve as the measuring means.

The invention will be better understood and further objects and advantages thereof will become more apparent from the ensuring detailed description of a preferred embodiment taken in conjunction with the drawings.

BRIEF DESCRIPTION OF THE DRAWINGS

FIG. 8(a) is a more detailed circuit diagram of elements 9, 10 and 11; and

DESCRIPTION OF THE PREFERRED EMBODIMENTS

Experiments carried out over the course of many years on vehicles having internal combustion engine with externally supplied ignition have shown that in 10% of the vehicles, after only 5,000 km of operation, the instant of ignition—and thus the emission of toxic substances as well—no longer corresponds to the value originally established. Tests and measurements have further shown that in the case of open-loop control of the instant of ignition in accordance with the intake manifold vacuum and rpm, which is conventional at this time, several important factors which would necessitate an adjustment of the ignition time are not taken into consideration. Atmospheric humidity and pressure, for instance, and the fuel-air composition in terms of fuel, oxygen content and exhaust gas recirculation have a very substantial influence on the ignition of the mixture in the combustion chambers. Depending on the ignition delay and the speed of ignition, there may be various locations for the peak combustion chamber pressure. It is known that virtually the identical distance from top dead center can be maintained for the location of the peak combustion chamber pressure over the entire operational range, in order to attain economical operation of an engine in terms of fuel consumption and engine wear. This has led to the suggestion that the instant of ignition be controlled in closed-loop fashion such that the position of the peak combustion chamber pressure assumes the desired value. However, in terms of mass-produced application in motor vehicles, the realization and disposition of the pressure probe is problematical.

Comparative measurements of the pressure profile and the ionic current profile over the crankshaft angle in engines having externally supplied ignition have demonstrated that at the maximum combustion chamber pressure a particularly high ionic current is also established. The cause for this is that maximal temperatures also occur in this case, particularly in the region of the ignition locations. As a result, the conversion speed of the charge (fuel-air mixture) and the mobility of the ions are increased.

Figure 1:
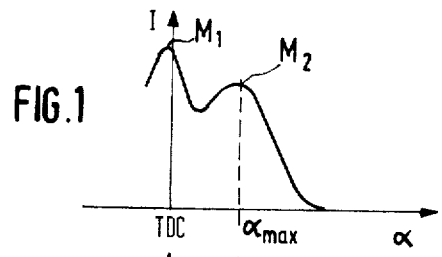
FIG. 1 is a diagram illustrating a first profile of the ionic current plotted over the crankshaft angle $\alpha$ with a first type of combustion sequence.
Figure 2:
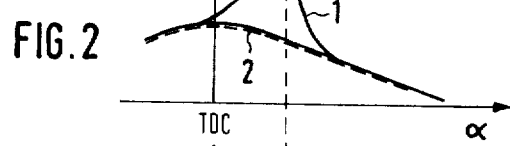
FIG. 2 shows the profile of the combustion chamber pressure plotted over the crankshaft angle.

FIG. 1 shows in schematic form the ionic current profile over the crankshaft angle $\alpha$ in the case of the conventional combustion of a relatively rich fuel-air mixture, measured at a spark plug acting as an ionic current sensor. The first maximum, $M_1$, of the ionic current, i.e., that occuring before top dead center, is the result of an intensive combustion directly following the inflammation of the fuel-air mixture at the spark plug. The second maximum, $M_2$, at a crankshaft angle $\alpha_{max}$ corresponding to it, results, as has already been noted, from the sharp increase in temperature in the region of the peak combustion chamber pressure. The diagram of FIG. 2, showing the peak pressure at the same time, shows that the ionic current maximum $M_2$ occurs at the same crankshaft angle $\alpha_{max}$ as does the peak combustion chamber pressure $P_{max}$. The solid-line curve 1 in FIG. 2 represents the pressure profile in the combustion chamber over the crankshaft angle $\alpha$ for the case where combustion of the fuel-air mixture is occurring. Curve 2 in FIG. 2 represents the pressure profile resulting solely from compression brought about by the reciprocating piston.

The coincident location of one maximum of the ionic current subsequent to top dead center and of the peak combustion chamber pressure makes it possible to ascertain the position of the peak combustion chamber pressure with the aid of the ionic current signal as well. Although there are two maximums present for the ionic current curve, it is possible to distinguish them from one another because the first maximum occurs in the region of the crankshaft angle before top dead center—that is, at the instant of ignition. Thus, the measurement range after top dead center is advantageously selected at angular gradations of $0° < \alpha < 90°$ and the position of the second maximum $M_2$ is ascertained.

Figure 4:
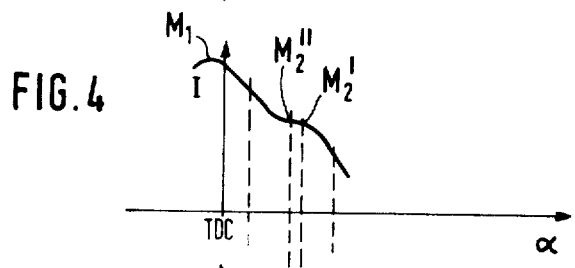
FIG. 4 is a diagram illustrating a second profile for the ionic current plotted over the crankshaft angle $\alpha$ with a second type of combustion sequence.
Figure 5:
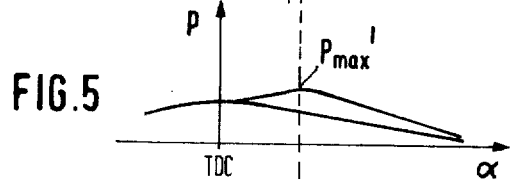
FIG. 5 illustrates the profile of the pressure in the combustion chamber, measured simultaneously for the case illustrated in FIG. 4, plotted over the crankshaft angle $\alpha$.
Figure 6:
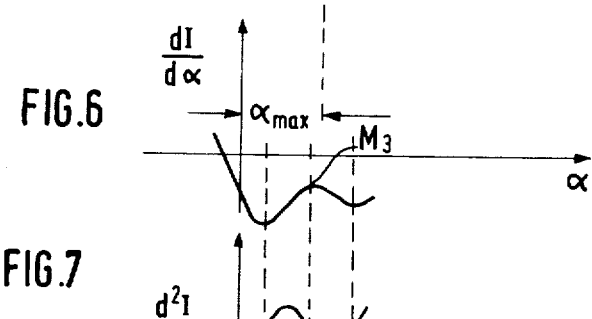
FIG. 6 depicts the curve for the first derivative $dI/d\alpha$ of the ionic current illustrated in FIG. 4.

In the event that a very lean fuel-air mixture is being combusted, it can happen that there is no clearly defined second maximum in the mathematical sense, especially in the lower torque range, and there is instead only a saddle-like flattening of the ionic current profile I ($\alpha$). This profile is shown in FIG. 4. In FIG. 5, the associated profile of the peak combustion chamber pressure is shown, here again exhibiting no clearly defined peak. It would be difficult in this case to ascertain the pressure peak using a pressure sensor, because as a rule this curve also has pressure fluctuations superimposed on it.

Figure 8:
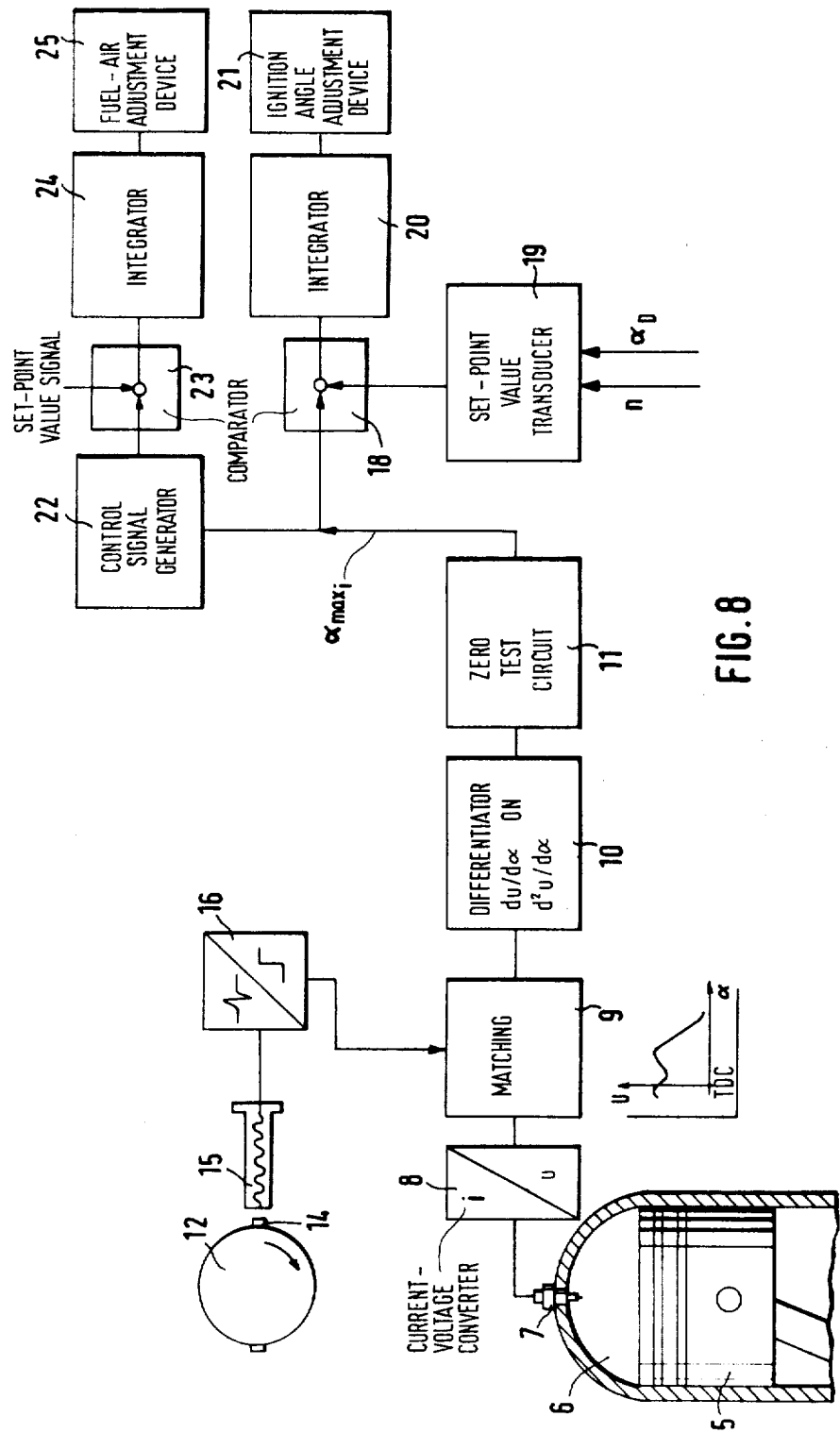
FIG. 8 illustrates an apparatus in block circuit diagram form which evaluates the ionic current for the purpose of closed-loop control of the instant of ignition.

FIG. 8 schematically shows the evaluation circuit for evaluating the ionic current signal to form a control variable for the adjustment of ignition time. One cylinder of an engine is shown in which a piston 5 encloses a main combustion chamber 6 in the cylinder. An ionic current sensor or a modified spark plug 7, which serves the purpose of ignition, is provided in the combustion chamber wall. The proportional current derived in a conventional manner from the ionic current sensor 7 is converted in a current-voltage converter 8 into a control voltage, U ($\alpha$), which is brought into a relationship (matched) with the crankshaft angle $\alpha$ in the circuit element 9. In the circuit element 10, the first or the second derivative, as a function of $\alpha$, $du/d\alpha$ or $d^2u/d\alpha$ is now formed from the control voltage signal U ($\alpha$) obtained from the ionic current.

Instead of current, an appropriate voltage which better lends itself to direct processing by the evaluation circuit can also be used.

Figure 3:
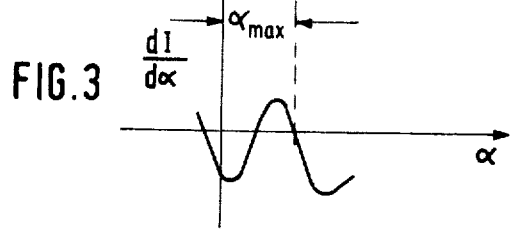
FIG. 3 depicts the curve for the first derivative $dI/d\alpha$ of the ionic current illustrated in FIG. 1.

In known fashion, when maximums of the generated curve are present, the first derivative of that curve passes through zero. From FIG. 3, it can be seen that the plus-to-minus zero passage corresponds to the occurrence of the second maximum $M_2$. This zero passage is detected in circuit element 11 and the associated crankshaft angle $\alpha_{max}$ is ascertained.

In the variant represented by FIGS. 4–7, corresponding to an ionic current profile lacking a clearly defined second maximum, it can be seen (FIG. 6) that the first derivative has no zero passages in the region of the crankshaft angle $0° < \alpha < 90°$. In this case, the first maximum $M_3$ of the first derivative must be sought in the region of the crankshaft angle $0° < \alpha < 90°$ after top dead center, which is effected with the aid of the second derivative of the ionic current, as a function of $\alpha$.

Figure 7:
FIG. 7 depicts the curve for the second derivative $dI^2/d\alpha$ of the ionic current illustrated in FIG. 4.

From FIG. 7 it can be seen that the plus-to-minus zero passage of curve $d^2I/d\alpha$, or $d^2U/d\alpha$, corresponds to this maximum of the first derivative. For reliably detecting the first maximum $M_3$ of the first derivative, either the second zero passage after top dead center of the second derivative or, as noted, the first plus-to-minus zero passage can be detected. The maximum $M_3$ of the first derivative according to FIG. 6 does exhibit a small error, however; it is not located precisely on the point $M_{2'}$, corresponding to $P_{max'}$ of FIG. 5, but rather somewhat earlier at $M_{2''}$, where the profile of curve I ($\alpha$) has its turning point. However, in view of the fluctuations in the position of the peak combustion chamber pressure, this error is negligible.

In order to maintain the association of the ionic current signal I ($\alpha$) or U ($\alpha$) to the crankshaft angle $\alpha$, a signal generated during the passage of the crankshaft through top dead center is delivered to the circuit element 9. To this end, the crankshaft 12 has signal markings 14, whose passage through top dead center is ascertained, for instance with an inductive transducer 15. With a pulse shaper 16, which is connected to the inductive transducer 15, a switching signal is generated which is delivered to circuit element 9. With this switching signal, a timing or angular measurement device, preferably the circuit element 10, can be started, which is interrogated by circuit element 11 at the instant the maximum ionic current appears. This angular value is then delivered as an actual value signal to a comparator circuit 18, which also receives a set-point value signal from a set-point value transducer 19. The comparator circuit 18 generates a difference signal from the set-point value signal and the actual value signal. In accordance with the deviation of the actual value signal from the set-point value (difference signal), an integrator 20 is triggered whose output signal is delivered to an adjustment device 21 for the ignition angle. A conventional, known device can be used as the timing or angular meaurement device, such as an integrator or a counter, where what is also counted may be, for instance, the number of angular increments passing by the inductive transducer.

In the presence of a clearly defined second maximum $M_2$ of the ionic current, the position of this maximum indicates in ideal fashion the position of the peak combustion chamber pressure $P_{max}$. As a result, the circuit element for ascertaining $\alpha_{max}$ can be so embodied that firstly the first derivative is tested for the presence of zero passages, and only thereafter, if zero passages are lacking, is the position of the second zero passage of the second derivative ascertained.

In forming the set-point value, it is possible to influence the position of the peak pressure, if this is necessary. Although, as discussed at the outset, the angular distance of the peak pressure from top dead center can be the same over the entire operational range, it is necessary under certain circumstances to vary this angular distance under particular operating conditions, for instance in order to increase torque. This may be effected by means of an appropriately embodied set-point transducer. Furthermore, in the case of a pure time measurement device for ascertaining $\alpha_{max}$, the influence of rpm on the ascertained $\alpha_{max}$ value can be compensated for. The set-point value can be varied in accordance with rpm in this case. The integrator 20 mentioned above is embodied advantageously as an electronic integrator; however, it can also be a final control element having integrating properties, which acts simultaneously as an amplifier.

In a supplementary embodiment, the signal $\alpha_{max}$ is further utilized in order to control the mixture composition in closed-loop fashion. Closed-loop engine smoothness control means are known with the aid of which closed-loop control of the mixture at the lean-running limit is possible. In such a case, the rpm fluctuations of the crankshaft, which are due to pressure fluctuations in the combustion chamber, are detected as an actual value and compared with a set-point value for the permissible width of fluctuation. If the fluctuations of the combustion chamber pressure values occurring in sequence upon each work cycle exceed the permissible value, then the fuel-air mixture is enriched until such time as the desired engine smoothness has again been attained.

In the exemplary embodiment of FIG. 8, a control signal is additionally generated in the circuit element 22 from the sequential values of $\alpha_{max}$, which corresponds to the roughness of the engine. This signal is compared in a comparator circuit 23 with a further set-point value signal, and a further difference signal resulting therefrom is fed to the integrator 24, whose output signal controls a fuel-air adjustment device 25 or an exhaust gas recirculation device.

The circuit element 22 for evaluating the sequential values of $\alpha_{max}$ is known, for instance from German Offenlegungsschriften (laid open applications) Nos. 24 34 743 or 24 17 187, which correspond U.S. Pat. Nos. 4,153,013 and 4,161,162.

In FIG. 8(a), the circuit element 10 for determining $du/d\alpha$ is shown in greater detail. It must be noted at the outset that for ascertaining the maximal values for $\alpha$ it is unimportant whether derivation is performed in accordance with time or in accordance with crankshaft angle. According to one advantageous embodiment it is achieved in accordance with time. To this end, a first differentiator 30 is provided in the circuit element 10, which differentiates the output voltage of the ion current sensor. Following the first differentiator 30 is a second differentiator 31, which forms the second derivitive on the basis of the output product of the first differentiator. The output of the second differentiator leads to the inverting input of a first operational amplifier 32, the reference input of which is set with a voltage divider 33 to approximately 0 V. The output of the first operational amplifier leads to a capacitor 34, the other terminal of which is connected via a resistor 35 to ground, parallel to which a first diode 36 is connected to ground in the blocking direction. The output of the capacitor 34 is further connected to a first output of an OR gate 38.

In an analogous fashion, the output of the first differentiator 30 is connected with the inverting input of a second operational amplifier 39, the reference input of which is set with a voltage divider 40 to 0 V. The output of the second operational amplifier 39 likewise leads to a capacitor 41, the other electrode of which is connected in turn, via a resistor 42, to ground, parallel to which a second diode 43 is connected to ground in the blocking direction. The capacitor 41 is further connected with the second input of the OR gate 38.

From the voltage signal arriving from the ion current sensor, the first derivitive in accordance with time is performed with the first differentiator 30, and the second derivitive in accordance with time is performed with the second differentiator 31. The derived control variables are now monitored as to the positive-to-negative passages. The first operational amplifier 32 or the second operational amplifier 39 first ascertain the zero passages in general. At the output, a steep voltage increase then appears, as the result of the threshold-value characteristic; this voltage increase is then converted via the subsequent resistor-capacitor combination into a voltage pulse. The associated diodes 36 and 43, respectively, have the task of permitting only voltage pulses in the positive direction to be passed on to the gate 38. The negative voltage peaks are derived via the diode. The voltage signals thus attained are passed on via the gate 38. To this end the output of the OR gate 38 is connected with one input of an AND gate 45, which is a component of the circuit 9, by means of which the derivitive values of the ion current signal are placed in a relationship with the crankshaft angle $\alpha$.

An essential component of this circuit portion is an integrator, comprising a third oeprational amplifier 47, the output of which is connected via a capacitor 48 with its inverting input. A first switch 49 is disposed parallel to the capacitor 48. At the output of the operational amplifier 47, a second switch 50 and a third switch 51 are disposed parallel to one another. The output of the two switches is connected via respective capacitors 52 and 53 to ground. The output of the second switch 50 is further connected with one input of a divider circuit 54 and the output of the third switch 51 is connected with the other input of the divider circuit 54. The output of the divider circuit 54 leads via a fourth operational amplifier 55 to a fourth switch 56.

In FIG. 8a, the pulse shaper 16 is also shown at the output of which rectangular pulses having an rpm-dependent frequency appear, controlled by a crankshaft marking. The output of the pulse shaper 16 is connected with both a first monostable multivibrator 57 and, via a inverting tate 58, with a second monostable multivibrator 59. The first monostable multivibrator 57 switches its state at the arrival of a leading edge of each of the pulses emitted by the pulse shaper 16 and at its Q output generates a pulse from the vertical edge. The second multivibrator 59 also reacts to the leading edge; however, since the pulse train of the pulse shaper 16 is inverted by the inverting gate 58, any pulse at the output of the multivibrator 59 indicates the trailing edge of each pulse emitted by the pulse shaper 16.

The pulses emitted by the second multivibrator 59 control the first switch 49. The integrator 47, 48 is therefore set by means of the brief closure of the switch 49. The output signal then increases traight up in linear fashion, until the integrator is again set by another closure of the first switch 59. In contrast, the output of the first multivibrator 57 controls the second switch 50, so that a maximum voltage value of the integrator output, corresponding for instance to the angle of revolution of 180°, is stored in the capacitor 52 shortly before the setting of the integrator. The third switch 51 is controlled by a third monostable multivibrator 61, the input of which is connected with the output of the AND gate 45. As long as a "1" signal is present at one input of the AND gate 45, every pulse emitted by the OR gate 38 can reach the multivibrator 61 and set it. With the setting of the multivibrator, the third switch is closed, and the instantaneous integration value of the integrator 47, 48 is fed into the capacitor 53.

In order to attain a "1" signal at the other input of the AND gate 45, a multivibrator 62 is provided, which is likewise controlled by the output of the first multivibrator 57. With the leading edge of each rectangular pulse emitted by the pulse shaper 16, the output of the multivibrator 62, connected with the AND gate 45, is set to 1. The reset input of the multivibrator 62 is further connected with the ignition, so that with every ignition which occurs before top dead center, the multivibrator is set back again, so that the signal 0 reaches the AND gate 45. In this state, until the setting of the integrator at top dead center with the trailing edge of each pulse emitted by the pulse shaper 16, signals from the circuit element 10 are thus prevented from being carried via the AND gate 45 for controlling the memory 43.

For further processing of the output signal of the fourth operational amplifier 55, which together with the divider circuit 54 serves to ascertain $\alpha_{max}$, the output of the fourth switch 56 is connected with a fifth operational amplifier 64 (FIG. 8b) and simultaneously connected to ground via a capacitor 65. The output of the fifth operational amplifier 64 leads further via a fifth switch 67 to the input of a sixth operational amplifier 6, the input of which is likewise connected to ground via a capacitor 68. The output of the sixth operational amplifier leads to the non-inverting input of a differential amplifier 69, the inverting input of which is connected directly with the output of the fifth operational amplifier. The output of the differential amplifier 69 is then connected with the comparator circuit 23 as shown in FIG. 8.

The above-described circuit portion, from the switch 56 on, represents the circuit element 22 shown in FIG. 8. It comprises two sample-and-hold elements, and the most recent output value of the fourth operational amplifier 55 at any given time is stored in the capacitor 65. This storage in memory is effected at clock times determined by the second multivibrator 59. The fifth switch 67 is controlled in turn by the first multivibrator 57 and causes the just-previous output value of the fourth operational amplifier at a given time to be stored in the capacitor 68. From the voltage values stored in the capacitors 65 and 68, the difference is formed continuously and supplied for the purpose of set-point/actual-value comparison to the comparator circuit 23.

On the mode of operation of the above-described circuit, it should be noted that with the aid of the integrator 47, 48, a time signal is generated which by the setting of the integrator and storage of the final integration value in the capacitor 52 is brought into a relationship with the crankshaft angle. If the voltage stored in the capacitor 52 is designated as $U_1$ and the voltage stored in the capacitor 53 is designated as $U_2$, then the ratio of $U_2/U_1 = \alpha_{max}/180°$, from which it can be determined that $\alpha_{max} = k \cdot U_2/U_1$. A signal corresponding to $\alpha_{max}$ appears at the output of the divider circuit 54. The voltage $U_2$ is then the voltage which corresponds to the crankshaft angle $\alpha_{max}$, at which a first maximum in the ion current voltage after top dead center appears. The instant at which the voltage corresponding to this $\alpha_{max}$ is stored in the capacitor 53 is controlled by the circuit element 10. As already described above, only the positive-to-negative passages in the first derivitive or the second derivitive of the ion current signal are ascertained, and corresponding control signals are delivered to the circuit portion 9. With the aid of the combination AND gate and multivibrator 62, plus-minus signals which occur before top dead center are prevented from being passed on to the third switch 52. The circuit furthermore functions such that both positive-to-negative passages of the first derivitive and positive-to-negative passages of the second derivitive trigger control signals of this kind. The last signal emitted at any given time is then the dominant signal. Thus a zero passage of the second derivitive is always ascertained first. A zero passage of this kind occurs in every case. On this point, reference is made to FIG. 7 and the associated descriptive text above. If a zero passage of the first derivitive appears as well, then this occurs after the passage of the second derivitive, so that the value of the first derivitive or the associated integration value of the integrator 47, 48 is stored.

For an embodiment in which engine roughness or the degree of fluctuation of the position of the peak combustion pressure controls the mixture or the exhaust gas recirculation rate, the differences of the $\alpha_{max}$ values are then formed in the circuit element 22.

Figure 8B:
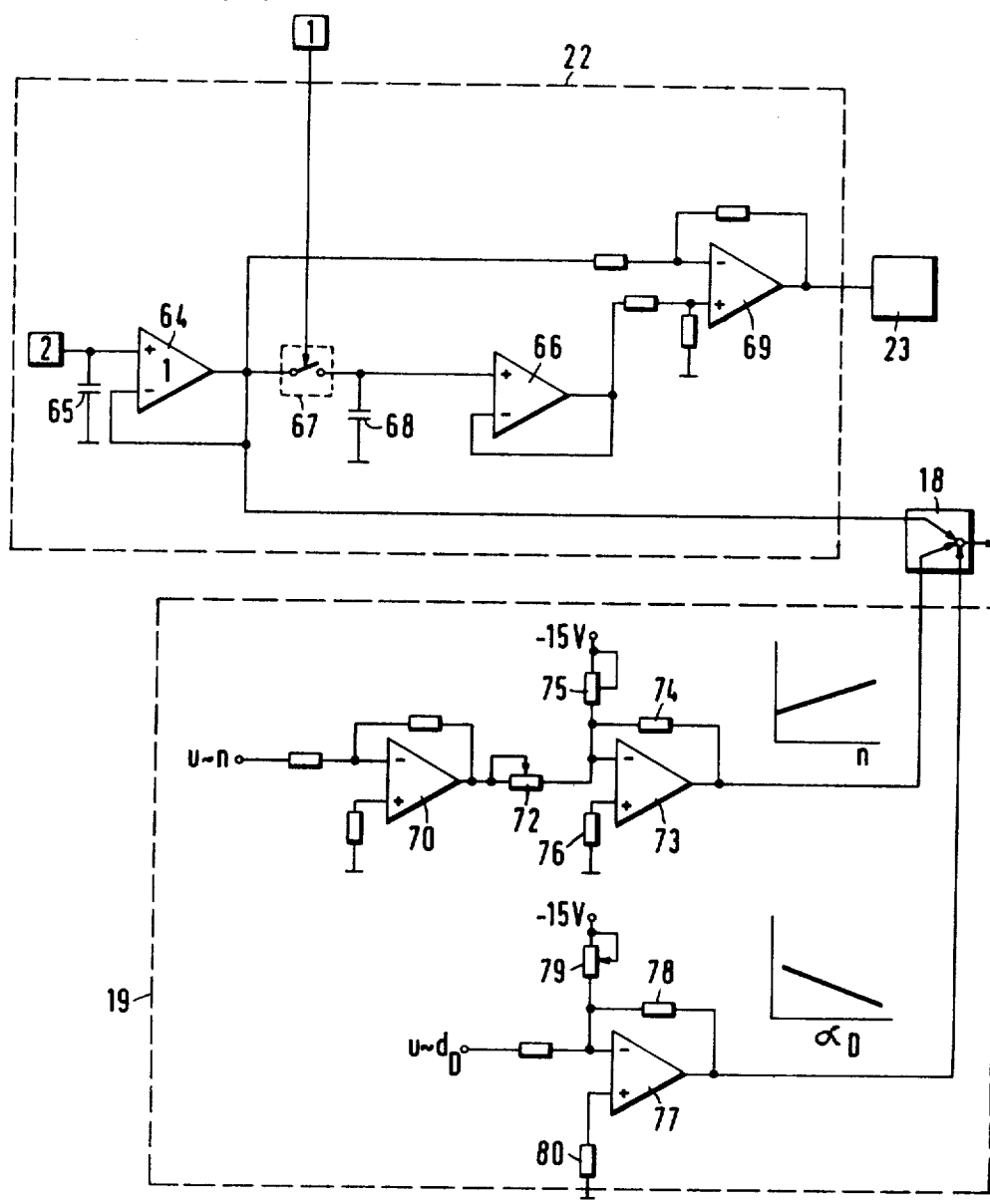
FIG. 8(b) is a more detailed circuit disgram of elements 19 and 22.

FIG. 8b furthermore shows an example of the set-point/actual-value comparison for controlling the adjustment of ignition. In the set-point value transducer 19, a first amplifier 70 is provided, at the inverting input of which there is an rpm signal, which is then present at the output of the amplifier in an inverted, amplified form. The output of the amplifier 70 leads via an adjustable resistor 72 to the inverting input of a second amplifier 37, the output of which is connected via a resistor 74 to the inverting input and the inverting input of which in turn is connected via an adjustable resistor 75 to a voltage source with negative potential. The reference input is connected to ground via a resistor 76. At the output of the second amplifier 73, a signal then appears which increases with the rpm and at rpm=0 has a predetermined, positive minimum value. The output of the second amplifier 73 is then carrier to a comparator circuit 18, at the input of which the output value of the fifth operational amplifier is present. The comparator circuit 18 is further connected with the output of a third amplifier 77, at the inverting input of which a voltage signal exists which is proportional to the throttle valve angle. Here, again, the output of the third amplifier 77 is connected via a resistor 78 with the inverting input, which is connected in turn via an adjustable resistor 79 to a voltage source with negative potential. The non-inverting input of the third amplifier 77 is connected via a resistor 80 to ground. At the output of the third amplifier 77, there is then a signal which decreases with an increasing opening angle of the throttle valve, beginning with a definite, positive value at $\alpha_D = 0$. The comparison of the set point with the actual value is performed by means of summation in the comparator circuit 18, the output of the comparator circuit 18 being connected with the integrator 20 as in FIG. 8.

The above-described embodiment should be considered as exemplary only. Naturally, it is also possible, in place of the analog evaluation shown here, to use a computer which operates in digital fashion.

The foregoing relates to a preferred exemplary embodiment of the invention, it being understood that other embodiments and variants thereof are possible within the spirit and scope of the invention, the latter being defined by the appended claims.

What is claimed and desired to be secured from Letters Patent of the United States is:

1. A method for the closed-loop control of the instant of ignition in an internal combustion engine to which an operational mixture is delivered, comprising the steps of:
    ascertaining the occurrence of the top dead center in sequential work cycles of at least one combustion chamber of the engine;
    measuring the ionic current released during combustion of the operational mixture in the combustion chamber by an ionic current sensor;
    detecting the occurrence relative to said occurrence of the top dead center of the peak of the first rising portion of a curve resulting from successively measured ionic current values within a crankshaft angle range of 0°–90° subsequent to when the ascertained top dead center occurrence in sequential work cycles of said at least one combustion chamber occurs;
    generating an actual value signal corresponding to the occurrence of said peak;
    generating a set-point value signal for the actual value signal;
    comparing the generated actual value signal to the generated set-point value signal and generating a difference signal; and
    adjusting the instant of ignition in accordance with the generated difference signal.

2. The method as defined in claim 1, wherein a signal is generated indicative of the ionic current measured, wherein a first derivative signal of the generated ionic current signal is generated, and wherein the occurrence of said peak is detected by ascertaining the first plus-to-minus zero passage, subsequent to the ascertained top dead center occurrence in sequential work cycles of said at least one combustion chamber, of the generated first derivative signal.

3. The method as defined in claim 1, wherein a signal is generated indicative of the ionic current measured, wherein a first derivative signal of the generated ionic current signal is generated, and wherein the occurrence of said peak is detected by ascertaining the second zero passage, subsequent to the ascertained top dead center occurrence in sequential work cycles of said at least one combustion chamber, of the generated first derivative signal.

4. The method as defined in claim 1, wherein a signal is generated indicative of the ionic current measured, a first derivative signal of the generated ionic current is generated, a second derivative signal of the generated ionic current signal is generated when the generated first derivative signal lacks any zero passages, and wherein the occurrence of said peak is detected by ascertaining the second zero passage, as a function of time subsequent to the ascertained top dead center occurrence in sequential work cycles of said at least one combustion chamber, of the generated second derivative signal.

5. The method as defined in claim 1, wherein a signal is generated indicative of the ionic current measured, a first derivative signal of the generated ionic current is generated a second derivative signal of the generated ionic current signal is generated when the generated first derivative signal lacks any zero passages, and wherein the occurrence of said peak is detected by ascertaining the second zero passage, as a function of crankshaft angle subsequent to the ascertained top dead center occurrence in sequential work cycles of said at least one combustion chamber, of the generated second derivative signal.

6. The method as defined in claim 1, wherein a signal is generated indicative of the ionic current measured, a first derivative signal of the generated ionic current is generated, a second derivative signal of the generated ionic current signal is generated when the generated first derivative signal lacks any zero passages, and wherein the occurrence of said peak is detected by ascertaining the first plus-to-minus zero passage, as a function of time subsequent to the ascertained top dead center occurrence in sequential work cycles of said at least one combustion chamber, of the generated second derivative signal.

7. The method as defined in claim 1, wherein a signal is generated indicative of the ionic current measured, a first derivative signal of the generated ionic current is generated, a second derivative signal of the generated ionic current signal is generated when the generated first derivative signal lacks any zero passages, and wherein the occurrence of said peak is detected by ascertaining the first plus-to-minus zero passage, as a function of crankshaft angle subsequent to the ascertained top dead center occurrence in sequential work cycles of said at least one combustion chamber, of the generated second derivative signal.

8. The method as defined in claim 1, wherein a signal is generated indicative of the ionic current measured, a first derivative signal of the generated ionic current signal is generated, and wherein the actual value signal is generated subsequent to ascertaining a second zero passage of the generated first derivative signal.

9. The method as defined in claim 1, wherein a signal is generated indicative of the ionic current measured, a first derivative signal of the generated ionic current is generated, a second derivative signal of the generated ionic current signal is generated when the generated first derivative signal lacks any zero passages, and wherein the actual value signal is generated subsequent to ascertaining a second zero passage, as a function of time, of the generated second derivative signal.

10. The method as defined in claim 1, wherein a signal is generated indicative of the ionic current measured, a first derivative signal of the generated ionic current is generated, a second derivative signal of the generated ionic current signal is generated when the generated first derivative signal lacks any zero passages, and wherein the actual value signal is generated subsequent to ascertaining a second zero passage, as a function of crankshaft angle, of the generated second derivative signal.

11. A method as defined in claim 1, wherein a signal is generated indicative of the ionic current measured, a first derivative signal of the generated ionic current is generated, a second derivative signal of the generated ionic current signal is generated when the generated first derivative signal lacks any zero passages, and wherein the actual value signal is generated subsequent to ascertaining a first plus-to-minus zero passage, as a function of time, of the generated second derivative signal.

12. The method as defined in claim 1, wherein a signal is generated indicative of the ionic current measured, a first derivative signal of the generated ionic current is generated, a second derivative signal of the generated ionic current signal is generated when the generated first derivative signal lacks any zero passages, and wherein the actual value signal is generated subsequent to ascertaining a first plus-to-minus zero passage, as a function of crankshaft angle, of the generated second derivative signal.

13. The method as defined in claim 1, wherein the set-point value signal is generated as a function of at least one operational parameter which has an effect on the ignitability of the operational mixture.

14. The method as defined in claim 1, wherein the set-point value signal is generated as a function of at least one parameter containing information relating to the instantaneous rpm of the engine.

15. The method as defined in claim 1, further comprising the steps of:
   detecting the fluctuations of the actual value signal and generating a control signal;
   generating a further set-point value signal for the control signal;
   comparing the control signal to the further set-point value signal and generating a further difference signal; and
   adjusting the proportion of at least one component of the operational mixture in accordance with the generated further difference signal.

* * * * *